United States Patent
Quinn et al.

(10) Patent No.: US 9,448,322 B2
(45) Date of Patent: Sep. 20, 2016

(54) SYSTEM AND METHOD TO DETERMINE VOLUMETRIC FRACTION OF UNCONVENTIONAL RESERVOIR LIQUID

(71) Applicants: Terrence H. Quinn, The Woodlands, TX (US); Michael P. Ashby, Houston, TX (US); Matt W. Bratovich, Spring, TX (US); Jinhong Chen, Katy, TX (US); Elton Frost, Spring, TX (US); Duane A. Sommer, Spring, TX (US); Daniel S. Warrington, Houston, TX (US); Jilin Zhang, Cypress, TX (US)

(72) Inventors: Terrence H. Quinn, The Woodlands, TX (US); Michael P. Ashby, Houston, TX (US); Matt W. Bratovich, Spring, TX (US); Jinhong Chen, Katy, TX (US); Elton Frost, Spring, TX (US); Duane A. Sommer, Spring, TX (US); Daniel S. Warrington, Houston, TX (US); Jilin Zhang, Cypress, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 825 days.

(21) Appl. No.: 13/866,459

(22) Filed: Apr. 19, 2013

(65) Prior Publication Data

US 2013/0282288 A1 Oct. 24, 2013

Related U.S. Application Data

(60) Provisional application No. 61/635,981, filed on Apr. 20, 2012.

(51) Int. Cl.
*G01V 3/14* (2006.01)
*G01V 3/32* (2006.01)
*G01V 3/38* (2006.01)
*G01V 9/00* (2006.01)

(52) U.S. Cl.
CPC . *G01V 3/38* (2013.01); *G01V 3/14* (2013.01); *G01V 3/32* (2013.01); *G01V 9/00* (2013.01)

(58) Field of Classification Search
CPC combination set(s) only.
See application file for complete search history.

(56) References Cited

U.S. PATENT DOCUMENTS

| | | |
|---|---|---|
| 6,477,516 B1 | 11/2002 | Colaiocco et al. |
| 6,573,715 B2 | 6/2003 | King et al. |
| 6,833,699 B2 | 12/2004 | Galford et al. |
| 6,844,729 B2 | 1/2005 | Herron et al. |

(Continued)

FOREIGN PATENT DOCUMENTS

| | | |
|---|---|---|
| WO | 03025625 A1 | 3/2003 |
| WO | 2011133859 A1 | 10/2011 |

OTHER PUBLICATIONS

Smith et al., "Comparison of Conventional Density and NMR Porosity with Core Porosity from the Montney and Doig Phosphate in the Monias area, N.E. B.C.", Geo Convention, 2012, pp. 1-2.

(Continued)

*Primary Examiner* — Huan Tran
(74) *Attorney, Agent, or Firm* — Cantor Colburn LLP

(57) ABSTRACT

A system determines a volumetric fraction of oil in a formation penetrated by a borehole, the formation comprising an unconventional reservoir. The system includes a carrier configured to be conveyed through the borehole and a geochemical tool disposed at the carrier and configured to determine a mineral makeup of the formation and excess carbon not apportioned to any mineral of the mineral makeup, the excess carbon being associated with kerogen and oil in the formation. An NMR tool disposed at the carrier determines porosity of fluid in the formation, the fluid excluding the kerogen in the formation. A density tool disposed at the carrier determines bulk density of the formation, and a processor determines the volumetric fraction of oil in the formation based on the excess carbon, the porosity of the fluid in the formation, and the bulk density of formation.

16 Claims, 4 Drawing Sheets

(56) References Cited

U.S. PATENT DOCUMENTS

| | | |
|---|---|---|
| 6,856,132 B2 | 2/2005 | Appel et al. |
| 6,859,032 B2 | 2/2005 | Heaton et al. |
| 7,205,762 B2 | 4/2007 | Blanz et al. |
| 7,309,983 B2 | 12/2007 | Freedman |
| 7,667,462 B2 | 2/2010 | Song et al. |
| 7,966,273 B2 | 6/2011 | Hegeman et al. |
| 8,093,056 B2 | 1/2012 | Ganesan |
| 8,165,817 B2 * | 4/2012 | Betancourt et al. ............ 702/13 |
| 2004/0032257 A1 | 2/2004 | Freedman |
| 2007/0246649 A1 | 10/2007 | Jacobi et al. |
| 2008/0179509 A1 | 7/2008 | Jacobi et al. |
| 2009/0248309 A1 | 10/2009 | Neville et al. |
| 2010/0155142 A1 | 6/2010 | Thambynayagam et al. |
| 2010/0228485 A1 | 9/2010 | Betancourt et al. |
| 2011/0068788 A1 | 3/2011 | Minh |
| 2011/0144913 A1 | 6/2011 | Klein et al. |

OTHER PUBLICATIONS

International Search Report and Written Opinion for PCT Application No. PCT/US2013/035439, dated Jul. 15, 2013, pp. 1-10.

* cited by examiner

SYSTEM AND METHOD TO DETERMINE VOLUMETRIC FRACTION OF UNCONVENTIONAL RESERVOIR LIQUID

CROSS-REFERENCE TO RELATED APPLICATION

This application is a Non-Provisional of U.S. Provisional Application No. 61/635,981 filed Apr. 20, 2012, the disclosure of which is incorporated by reference herein in its entirety.

BACKGROUND

Geologic formations can have many uses such as hydrocarbon production, geothermal production, and carbon dioxide sequestration. Oil-bearing or condensate-bearing shale is referred to as an unconventional reservoir. Unconventional reservoirs are a relatively new area of exploration. Efficient drilling of these unconventional reservoirs requires an understanding of the host rock and moveable and immoveable fluid properties. Thus, techniques that facilitate that understanding would be appreciated in the drilling industry.

SUMMARY

According to one aspect of the invention, a system to determine a volumetric fraction of oil in a formation penetrated by a borehole, the formation comprising an unconventional reservoir, includes a carrier configured to be conveyed through the borehole; a geochemical tool disposed at the carrier and configured to determine a mineral makeup of the formation and excess carbon not apportioned to any mineral of the mineral makeup, the excess carbon being associated with kerogen and oil in the formation; an NMR tool disposed at the carrier and configured to determine porosity of fluid in the formation, the fluid excluding the kerogen in the formation; a density tool disposed at the carrier and configured to determine bulk density of the formation; and a processor configured to determine the volumetric fraction of oil in the formation based on the excess carbon, the porosity of the fluid in the formation, and the bulk density of formation.

According to another aspect of the invention, a method of determining a volumetric fraction of oil in a formation penetrated by a borehole, the formation comprising an unconventional reservoir, includes obtaining measurements from downhole tools, the measurements indicating excess carbon, the excess carbon being associated with kerogen and oil in the formation, bulk density, and porosity of the fluid in the formation; determining inorganic grain density of the formation based on a determined mineral makeup of the formation; determining the kerogen component of the excess carbon; and determining the volumetric fraction of oil in the formation based on the excess carbon and the kerogen component of the excess carbon.

BRIEF DESCRIPTION OF THE DRAWINGS

Referring now to the drawings wherein like elements are numbered alike in the several Figures.

DETAILED DESCRIPTION

While one or more embodiments have been shown and described, modifications and substitutions may be made thereto without departing from the spirit and scope of the invention. Accordingly, it is to be understood that the present invention has been described by way of illustrations and not limitation.

Determination of the volume of oil in the unconventional reservoir is of particular interest. The apparatus and method detailed below as non-limiting embodiments determine the oil volume using measurements from several downhole tools and one or more processors.

Figure 1:
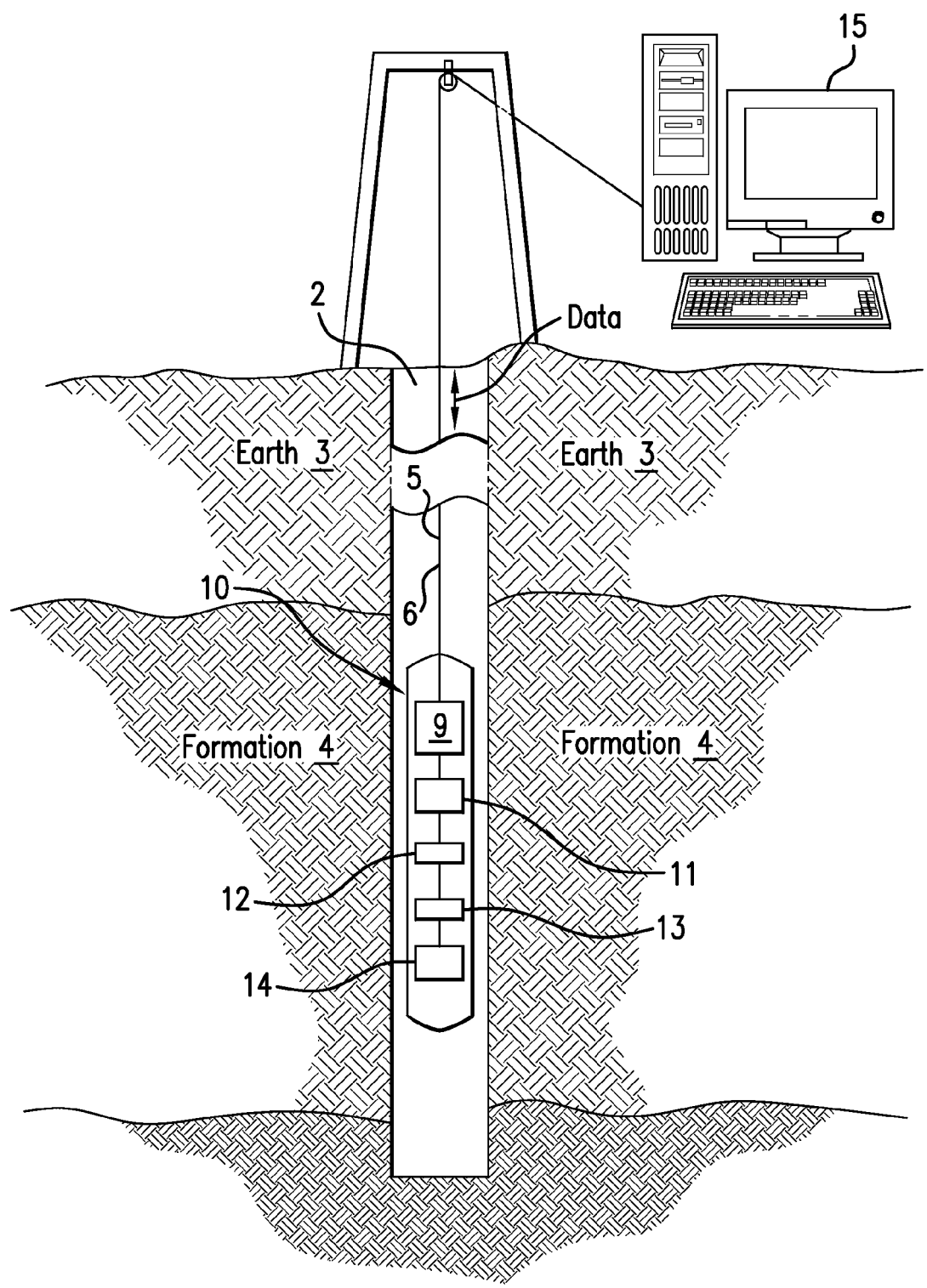
FIG. 1 illustrates a cross-sectional view of an exemplary embodiment of an apparatus to determine the volumetric fraction of unconventional reservoir liquid.

FIG. 1 illustrates a cross-sectional view of an exemplary embodiment of an apparatus to determine the volumetric fraction of unconventional reservoir liquid. A downhole tool 10 disposed in a borehole 2 penetrating the earth 3, which includes an earth formation 4. The formation 4 represents any subsurface material of interest. The downhole tool 10 is configured to perform one or more types of measurements and is conveyed through the borehole 2 by a carrier 5. In the embodiment of FIG. 1, the carrier 5 is an armored wireline 6 used in wireline logging after drilling has ceased.

Figure 2:
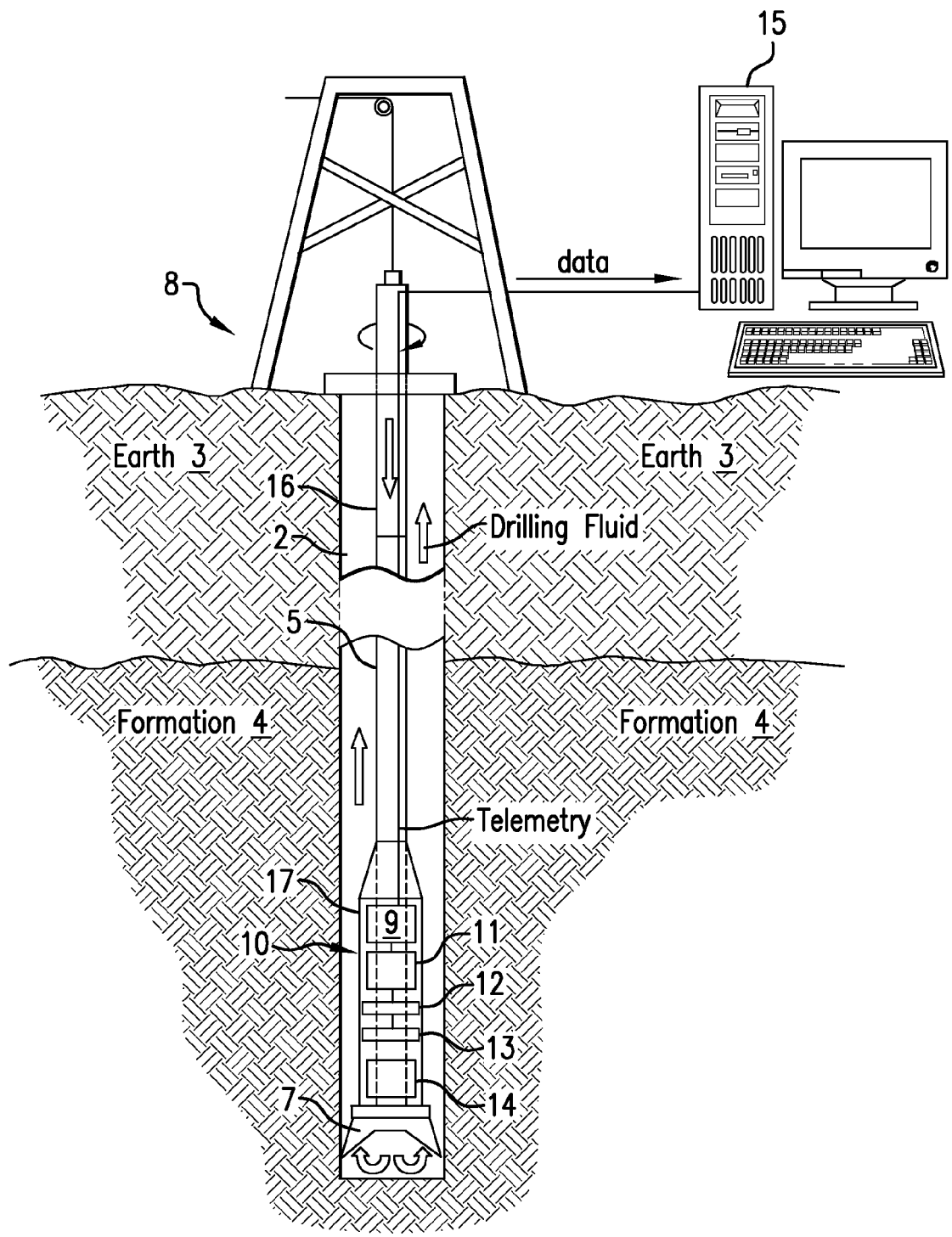
FIG. 2 illustrates a cross-sectional view of another exemplary embodiment of an apparatus to determine the volumetric fraction of unconventional reservoir liquid.

FIG. 2 illustrates a cross-sectional view of another exemplary embodiment of an apparatus to determine the volumetric fraction of unconventional reservoir liquid. In the embodiment of FIG. 2, the carrier 5 is a drill string 16 in an embodiment known as Logging-While-Drilling (LWD), and the downhole tool 10 is a bottomhole assembly 17. Disposed at a distal end of the drill string 16 is a drill bit 7. A drilling rig 8 is configured to conduct drilling operations such as rotating the drill string 16 and thus the drill bit 7 in order to drill the borehole 2. In addition, the drilling rig 8 is configured to pump drilling fluid through the drill string 16 in order to lubricate the drill bit 7 and flush cuttings from the borehole 2.

The downhole tool 10 includes tools for performing the measurements in the borehole. Downhole electronics 9 may be configured to operate and/or process the information obtained by the tools and interface with telemetry (such as mud pulse telemetry) to communicate data to the computer processing system 15 at the surface of the earth 3. In the embodiments of FIGS. 1 and 2, the downhole tool 10 includes a geochemical tool 11, an NMR tool 12, a density tool 13, and spectroscopy tool 14. In alternate embodiments, additional tools may be disposed within or on the surface of the downhole tool 10.

An exemplary geochemical tool 11 is the Baker Hughes Formation Lithology eXplorer™ (FLeX) tool. The geochemical tool 11 obtains induced gamma ray spectroscopy logs from gamma rays of inelastic and capture neutron reactions. An exemplary spectroscopy tool 14 is the Baker Hughes Spectralog™ tool. The spectroscopy tool 14 obtains of naturally occurring gamma radiation. One or more processors of one or both of the tools 11, 14 or a processor separate from both tools 11, 14 uses the logs obtained by the geochemical tool 11 and the spectroscopy tool 14 to determine the mineral makeup of the formation. In one embodiment, a rule-based algorithm is used to apportion the elements obtained by the tools 11, 14 to minerals. This rule-based process thus provides the inorganic minerals. When the apportioning process is completed, any carbon that cannot be apportioned (i.e., excess carbon) or the carbon weight fraction measurement after removal of carbon weight fractions associated with the identified inorganic minerals with carbon as a component is determined. This excess carbon is associated with the unconventional reservoir and represents, at least in part, the carbon comprised by the kerogen and hydrocarbons of the unconventional reservoir. In addition, based on the determined mineral makeup of the formation, a total grain density or density of only the inorganic minerals in the formation is determined (inorganic grain density).

The NMR tool 12 provides porosity of the formation. Generally, the NMR tool 12 generates a static magnetic field or, in alternate embodiments, uses the earth's magnetic field and then applies a pulse of a magnetic field to disturb the established nuclear spin alignment of elements in the formation. When the spins precess back to an aligned state based on a refocusing pulse, spin echo signals are generated. The NMR 12 tool includes a receiving coil so that a voltage is induced by the precessing spins. Signals received by the receiving coil are referred to as NMR signals and these signals are used to determine properties of the formation such as porosity. It bears noting that the NMR tool 12 operates only on fluids in the formation and views the kerogen as a rock. That is, the porosity determined by the NMR tool 12 (NMR porosity) does not take into account the kerogen but does account for the oil.

The density tool 13 is a well logging tool known in the art. The density tool 13 continuously records the formation's bulk density. The formation density is made up of the density of the minerals forming the rock (i.e., matrix) and the fluid enclosed in pore spaces. With respect to the unconventional reservoirs, the density tool 13 records bulk density including the kerogen and oil.

Using the above-discussed values obtained from the tools 11, 12, 13, 14, the volumetric fraction of oil of the formation 4 and saturation of oil of the formation 4 is determined as discussed below. The intermediate and final values may be computed by one or more processors working with one or more memory devices of the downhole electronics 9, the computer processing system 15, or another processing system that receives the measured data.

The solid portion of the formation refers to the minerals identified by the geochemical and spectroscopy tools 11, 14 and the kerogen in the unconventional reservoir. Density of the solid portion of the formation 4 $\rho_{solid}$ is resolved from the following equation:

$$\rho_b = \rho_{solid} * (1-\phi_{NMR}) + \rho_{fluid} * \phi_{NMR} \qquad [EQ\ 1]$$

where $\rho_b$ is the bulk density from the density tool 13, $\phi_{NMR}$ is the NMR porosity from the NMR tool 12, and $\rho_{fluid}$=density of the fluid in the formation 4, which is, for example, assumed to be approximately 1.0 g/cc. The value may instead by derived from experimentation or calculations.

The $\rho_{fluid}$ value may be refined based on laboratory experiments, as discussed below.

Once $\rho_{solid}$ is determined using EQ 1, the volumetric portion of kerogen $V_{kerogen}$ in the solid portion of the formation 4 can be calculated as:

$$\rho_{solid} = \rho_{minerals} * (1-V_{kerogen}) + \rho_{kerogen} * V_{kerogen} \qquad [EQ\ 2]$$

where $\rho_{minerals}$ is the inorganic grain density determined from the geochemical and spectroscopy tools 11, 14, and $\rho_{kerogen}$=the kerogen density, which is, for example, commonly assumed to be approximately 1.25 g/cc. The value may instead be derived from experimentation or calculations.

The $V_{kerogen}$ computed using EQ 2 is used to determine the weight fraction of kerogen in the formation 4 $W_{kerogen}$ as:

$$W_{kerogen} = \frac{V_{kerogen} * (1-\phi_{NMR}) * \rho_{kerogen}}{\rho_b} \qquad [EQ\ 3]$$

Then, based on the weight fraction of kerogen, the weight fraction of carbon in the kerogen relative to the carbon in the formation 4 $W_{C\_Kerogen}$ is determined as:

$$W_{C\_Kerogen} = W_{kerogen} * C_k \qquad [EQ\ 4]$$

where $C_k$=weight portion of carbon in pure kerogen, which is, for example, normally assumed to be approximately 0.89. The value may instead be derived from experimentation or calculations.

As noted with respect to the discussion of the geochemical and spectroscopy tools 11, 14, excess carbon is associated with the unconventional reservoir and represents, at least in part, the carbon comprised by the kerogen and hydrocarbons (oil) of the unconventional reservoir. Thus, based on $W_{C\_Kerogen}$ computed with EQ 4, the weight fraction of carbon residing in the oil relative to the carbon in the formation 4 $W_{C\_oil}$ is computed as follows:

$$W_{C\_oil} = W_{ExcessCarbon} - W_{C\_Kerogen} \qquad [EQ\ 5]$$

where $W_{ExcessCarbon}$ is the weight fraction of the excess carbon determined using the tools 11, 14.

Based on the result of EQ 5, the weight fraction of oil in the formation 4 $W_{oil}$ is calculated as:

$$W_{oil} = W_{C\_oil} * C_{oil} \qquad [EQ\ 6]$$

where $C_{oil}$ is the weight portion of carbon in pure oil, which is a known value of 85% on average.

Based on the weight fraction of oil from EQ 6, the volumetric fraction of oil of the formation 4 $V_{oil}$ is calculated as:

$$V_{oil} = W_{oil}/\rho_{oil} \qquad [EQ\ 7]$$

where $\rho_{oil}$ is the density of oil, which is assumed to be, for example, approximately 0.8 g/cc. The value may be derived instead from experimentation or calculations.

In addition to the volumetric fraction of oil, saturation of oil of the formation 4 is calculated as:

$$S_{oil} = V_{oil}/\phi_{NMR} \qquad [EQ\ 8]$$

Figure 3:
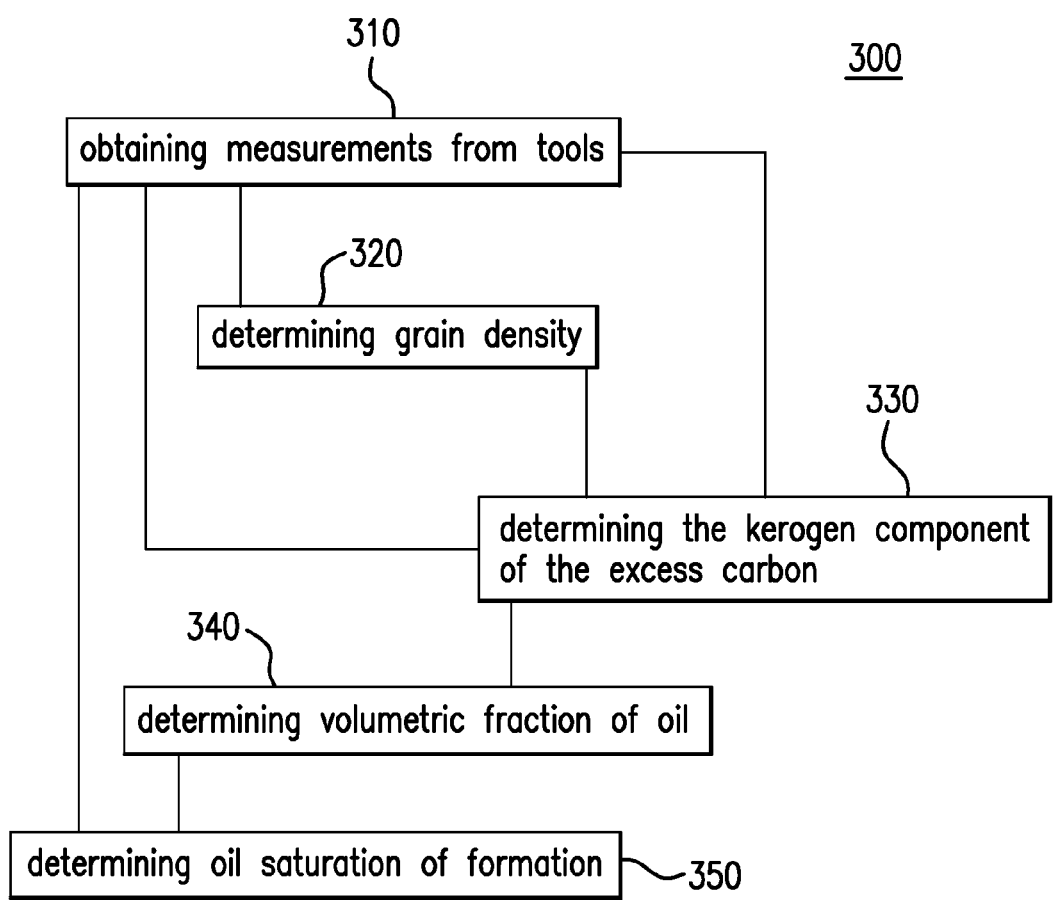
FIG. 3 depicts various processes involved in determining the volumetric fraction of unconventional reservoir liquid according to an embodiment of the invention.

FIG. 3 depicts various processes 300 involved in determining the volume of unconventional reservoir liquid according to an embodiment of the invention. At 310, the processes 300 include obtaining measurements from the tools 11, 12, 13, 14 in the downhole tool 10. The measurement results include the above-discussed excess carbon based on the geochemical and spectroscopy tools 11, 14, NMR porosity from the NMR tool 12, and bulk density from the density tool 13. At 320, determining inorganic grain density is based on the mineralogy profile developed with the geochemical tool 11 and spectroscopy tool 14. The processes 200 include determining the kerogen component of the excess carbon at 330. Block 230 includes executing EQ 2 through EQ 4 to determine the volumetric portion of kerogen in the solid portion of the formation, the weight fraction of kerogen in the formation 4, and the weight fraction of carbon residing in kerogen compared to carbon in the formation 4. At 340, determining the volumetric fraction of oil in the formation 4 includes executing EQ 5 through EQ 7 to determine the weight fraction of carbon in the oil compared with the carbon in the formation 4, the weight fraction of oil in the formation 4 in order to determine the volumetric fraction of oil in the formation 4. At 350, determining oil saturation of the formation 4 includes executing EQ 8 and determining oil saturation based on the volumetric fraction of oil and the fluid-filled porosity determined by the NMR tool 12.

Figure 4:
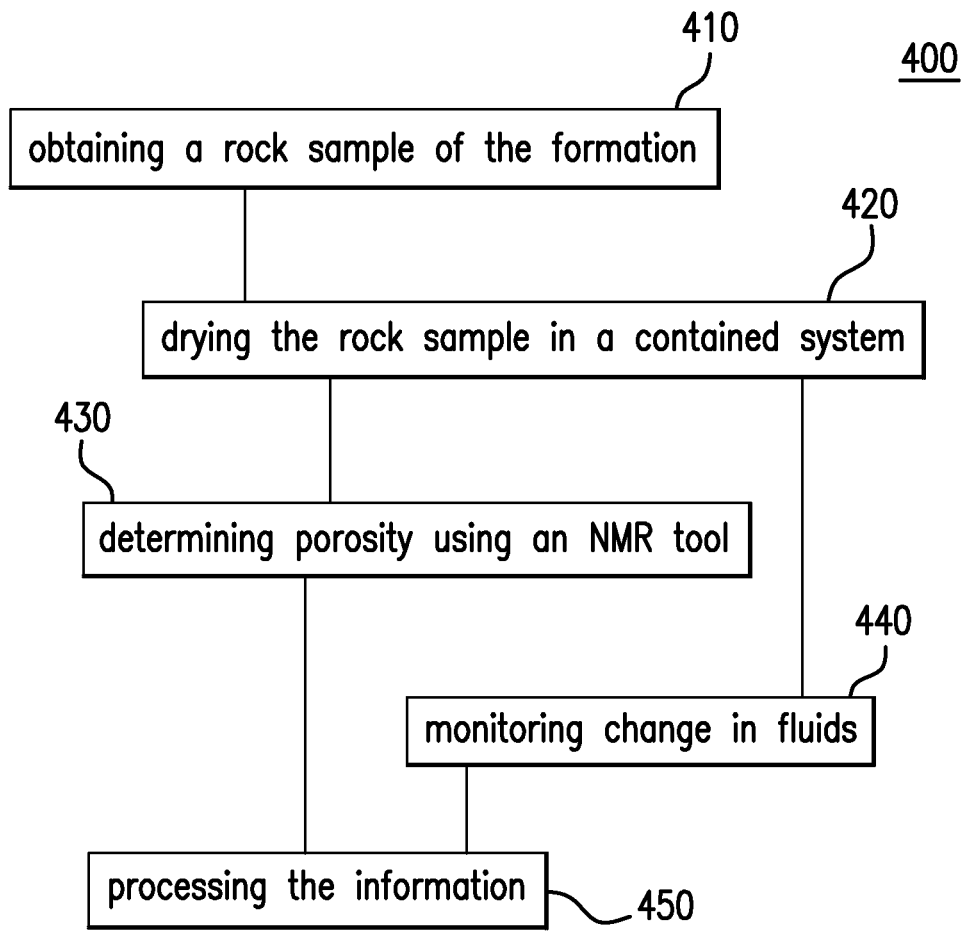
FIG. 4 depicts processes involved in processing a rock sample of the formation according to an embodiment of the invention.

FIG. 4 depicts processes 400 involved in processing a rock sample of the formation 4 according to an embodiment of the invention. The processes 400 serve to calibrate the volumetric fraction of oil determination and oil saturation determination discussed above and also provide additional information about the formation 4. The processes 400 include obtaining a rock sample of the formation 4 at 410 in a manner known in the art. Drying the rock sample in a contained system at 420 includes controlling the temperature during the drying process. In one embodiment, the temperature is sufficiently high to drive off water and liquid hydrocarbons over time (e.g., a period of days) but sufficiently low to prevent any change in characteristic of the rock or its porosity. At 430, determining porosity using an NMR tool 12 includes determining porosity of the rock sample before, during, and after the drying process. While the NMR tool 12 may be similar to the NMR tool 12 used in the borehole, it will be in a laboratory setting when determining porosity of the rock sample. At 440, monitoring the change in fluids of the rock sample also includes monitoring before, during, and after the drying process. At 450, processing the information collected before, during, and after the drying process provides calibration of the processor results discussed with respect to FIG. 1 and also provides additional information about the formation. The computer processing system 15 or other processor in the laboratory setting that includes one or more processors and one or more memory devices is used to process the information collected before, during, and after the drying process.

The porosity measurements taken before, during, and after the drying process validate the porosity values measured by the NMR tool 12 downhole. In addition, the porosity values give additional information. Porosity, which is a measure of the void spaces or fraction of the volume of voids over the total volume of the rock sample, for fluid in the rock sample will differ from porosity values for the same amount of fluid in a tank because of the interaction between the fluid and the rock and surface interaction. Thus, by monitoring the NMR porosity measurements as the fluid leaves the rock sample during the drying process, the pore size distribution of the rock sample is characterized. Oil saturation of the rock sample and water saturation of the rock sample (which is 1−oil saturation) can also be determined through the processes 400. That is, the percentage of each of water and oil in the pore spaces of the rock sample are determined.

In one embodiment, the processes 400 of FIG. 4 are used to refine the fluid density value $\rho_{fluid}$ used in EQ 1. If no gas is present, the fluid density value is determined as:

$$\rho_{fluid} = \rho_{oil} * (1 - Sw) + \rho_{water} * S_w \qquad [EQ\ 9]$$

where $\rho_{oil}$ is the density of oil determined from the drying process, $\rho_{water}$ is the density of water determined form the drying process, and $S_w$ is the saturation of water (i.e., the volumetric portion of water in the void pore space) also determined in the laboratory setting.

If gas is present in the rock sample, another term can be added to EQ 9 to apportion all three densities: oil, water, and gas.

In support of the teachings herein, various analysis components may be used, including a digital and/or an analog system. For example, the downhole electronics 9 and the computer processing system 15 may include a digital and/or analog system. Each system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art.

It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A system to determine a volumetric fraction of oil in a formation penetrated by a borehole, the formation comprising an unconventional reservoir, the system comprising:
   a carrier configured to be conveyed through the borehole;
   a geochemical tool disposed at the carrier and configured to determine a mineral makeup of the formation and excess carbon not apportioned to any mineral of the mineral makeup, the excess carbon being associated with kerogen and oil in the formation;
   an NMR tool disposed at the carrier and configured to determine porosity of fluid in the formation, the fluid excluding the kerogen in the formation;
   a density tool disposed at the carrier and configured to determine bulk density of the formation; and
   a processor configured to determine the volumetric fraction of oil in the formation based on the excess carbon, the porosity of the fluid in the formation, and the bulk density of formation.

2. The system according to claim 1, further comprising a spectroscopy tool disposed at the carrier and, in conjunction with the geochemical tool, configured to determine an inorganic grain density of the formation.

3. The system according to claim 1, wherein the processor determines volumetric fraction of oil $V_{oil}$ as:

$$V_{oil} = W_{oil}/\rho_{oil},$$

where $W_{oil}$ is a weight fraction of oil in the formation, and $\rho_{oil}$ is a known density of oil.

4. The system according to claim 3, wherein the processor determines oil saturation of the formation as:

$$S_{oil} = V_{oil}/\phi_{NMR},$$

where $\phi_{NMR}$ is the porosity of the fluid determined by the NMR tool.

5. The system according to claim 3, wherein the processor determines the weight fraction of oil $W_{oil}$ as:

$$W_{oil} = W_{C\_oil} * C_{oil},$$

where $C_{oil}$ is a known weight portion of carbon in pure oil, and
$W_{C\_oil}$ is a weight fraction of carbon residing in the oil relative to carbon in the formation.

6. The system according to claim 5, wherein the processor determines the weight fraction of carbon residing in the oil relative to the carbon in the formation as:

$$W_{C\_oil} = W_{ExcessCarbon} - W_{C\_Kerogen},$$

where $W_{C\_Kerogen}$ is a weight fraction of carbon in the kerogen relative to the carbon in the formation, and
$W_{ExcessCarbon}$ is the excess carbon determined using the geochemical tool.

7. The system according to claim 6, wherein the weight fraction of the carbon in the kerogen relative to the carbon in the formation is determined as:

$$W_{C\_Kerogen} = W_{kerogen} * C_k,$$

where $C_k$ = weight portion of carbon in pure kerogen, and $$W_{kerogen} = \frac{V_{kerogen} * (1 - \phi_{NMR}) * \rho_{kerogen}}{\rho_b},$$

where $V_{kerogen}$ is a volumetric portion of the kerogen in the solid portion of the formation, $\phi_{NMR}$ is the porosity of the fluid determined by the NMR tool, and
$\rho_b$ is the bulk density determined by the density tool.

8. The system according to claim 7, wherein the processor determines the volumetric portion of the kerogen in the solid portion of the formation from the following:

$$\rho_{solid} = \rho_{minerals} * (1 - V_{kerogen}) + \rho_{kerogen} * V_{kerogen},$$

where $\rho_{solid}$ is density of a solid portion of the formation,
$\rho_{minerals}$ is the inorganic grain density determined from the geochemical tool and the spectroscopy tool, and
$\rho_{kerogen}$ = the kerogen density.

9. The system according to claim 8, wherein the processor determines the density of the solid portion of the formation from:

$$\rho_b = \rho_{solid} * (1 - \phi_{NMR}) + \rho_{fluid} * \phi_{NMR},$$

where
$\rho_{fluid}$ = density of the fluid in the formation.

10. A method of determining a volumetric fraction of oil in a formation penetrated by a borehole, the formation comprising an unconventional reservoir, the method comprising:
    obtaining measurements from downhole tools, the measurements indicating excess carbon, the excess carbon being associated with kerogen and oil in the formation, bulk density, and porosity of the fluid in the formation;
    determining inorganic grain density of the formation based on a determined mineral makeup of the formation;
    determining the kerogen component of the excess carbon; and
    determining the volumetric fraction of oil in the formation based on the excess carbon and the kerogen component of the excess carbon.

11. The method according to claim 10, further comprising determining oil saturation of the formation based on the volumetric fraction of the oil and the porosity of the fluid in the formation.

12. The method according to claim 10, wherein the determining the kerogen component of the excess carbon includes determining a weight fraction of carbon in the kerogen as:

$$W_{C\_Kerogen} = W_{kerogen} * C_k,$$

where $C_k$ = weight portion of carbon in pure kerogen, and $$W_{kerogen} = \frac{V_{kerogen} * (1 - \phi_{NMR}) * \rho_{kerogen}}{\rho_b},$$

where $V_{kerogen}$ is a volumetric portion of the kerogen in the solid portion of the formation,
$\phi_{NMR}$ is the porosity of the fluid in the formation, and
$\rho_b$ is the bulk density.

13. The method according to claim 12, wherein the determining the kerogen component of the excess carbon further includes determining the volumetric portion of the kerogen in the solid portion of the formation as:

$$\rho_{solid} = \rho_{minerals} * (1 - V_{kerogen}) + \rho_{kerogen} * V_{kerogen},$$

where $\rho_{solid}$ is density of a solid portion of the formation,
$\rho_{minerals}$ is the inorganic grain density, and
$\rho_{kerogen}$ = the kerogen density.

14. The method according to claim 13, wherein the determining the volumetric portion of the kerogen in the solid portion of the formation includes determining the density of the solid portion of the formation as:

$$\rho_b = \rho_{solid} * (1 - \phi_{NMR}) + \rho_{fluid} * \phi_{NMR},$$

where $\rho_{fluid}$=density of the fluid in the formation.

15. The method according to claim 14, wherein the determining the weight fraction of oil $W_{oil}$ includes determining:

$$W_{oil} = W_{C\_oil} * C_{oil},$$

where $C_{oil}$ is a known weight portion of carbon in pure oil, and $W_{C\_oil}$ is a weight fraction of carbon residing in the oil relative to carbon in the formation.

16. The method according to claim 15, wherein the determining the weight fraction of the carbon residing in the oil relative to the carbon in the formation includes determining:

$$W_{C\_oil} = W_{ExcessCarbon} - W_{C\_Kerogen},$$

where $W_{C\_Kerogen}$ is the weight fraction of the carbon in the kerogen relative to the carbon in the formation, and $W_{ExcessCarbon}$ is the excess carbon.

* * * * *